US012579426B2

(12) United States Patent   (10) Patent No.:   US 12,579,426 B2
Jiao et al.   (45) Date of Patent:   Mar. 17, 2026

(54) TRAINING A NEURAL NETWORK HAVING SPARSELY-ACTIVATED SUB-NETWORKS USING REGULARIZATION

(71) Applicant: Microsoft Technology Licensing, LLC, Redmond, WA (US)

(72) Inventors: Jian Jiao, Bellevue, WA (US);
Xiaodong Liu, Redmond, WA (US);
Jianfeng Gao, Woodinville, WA (US);
Ruofei Zhang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 972 days.

(21) Appl. No.: 17/498,737

(22) Filed: Oct. 11, 2021

(65) Prior Publication Data

US 2023/0081624 A1      Mar. 16, 2023

Related U.S. Application Data

(60) Provisional application No. 63/244,714, filed on Sep. 15, 2021.

(51) Int. Cl.
G06N 3/08 (2023.01)
G06F 18/20 (2023.01)
G06N 3/045 (2023.01)

(52) U.S. Cl.
CPC ............. G06N 3/08 (2013.01); G06F 18/285 (2023.01); G06N 3/045 (2023.01)

(58) Field of Classification Search
CPC ........ G06F 18/285; G06N 3/08; G06N 3/045; G06N 3/0499; G06N 3/082; G06N 3/084; G06N 3/0455
See application file for complete search history.

(56) References Cited

U.S. PATENT DOCUMENTS

| | | | | |
|---|---|---|---|---|
| 12,033,079 B2 * | 7/2024 | Meyerson | ............ | G06N 3/0985 |
| 2019/0287515 A1 * | 9/2019 | Li | ........................... | G06N 3/084 |

(Continued)

OTHER PUBLICATIONS

Shazeer, N. et al., "Outrageously Large Neural Networks: The Sparsely-Gated Mixture-of-Experts Layer", https://arxiv.org/abs/1701.06538 (Year: 2017).*

(Continued)

*Primary Examiner* — Alexey Shmatov
*Assistant Examiner* — Devika S Maharaj

(57)   ABSTRACT

A training technique trains a neural network having sparsely-activated sub-networks. It does so by processing plural batches of training data in two respective passes of the neural network, yielding first prediction information and second prediction information. For each batch, the technique randomly assigns different sub-networks in the first and second passes of the neural network to process the batch. Over the course of training, the technique attempts to minimize loss information, which describes the difference between the first prediction information and ground-truth information, and the difference between the second prediction information and the ground-truth information. Simultaneously, the technique attempts to minimize divergence information, which describes the divergence of the first prediction information from the second prediction information (and vice versa). The technique can produce an inference-stage model by arbitrarily selecting at least one of the trained sub-networks in the neural network, for use in a production system.

19 Claims, 8 Drawing Sheets

(56) References Cited

U.S. PATENT DOCUMENTS

| | | | | |
|---|---|---|---|---|
| 2021/0279595 A1* | 9/2021 | Sridhar | | G06N 3/084 |
| 2022/0101098 A1* | 3/2022 | Li | | G06N 3/042 |
| 2022/0300711 A1* | 9/2022 | Elisco | | G06F 16/93 |
| 2023/0289563 A1* | 9/2023 | Li | | G06N 3/045 |

OTHER PUBLICATIONS

Brown, et al., "Language Models are Few-Shot Learners," arXiv e-print, arXiv:2005.14165v4 [cs.CL], Jul. 22, 2020, 75 pages.

Clark, et al., "Think you have Solved Question Answering? Try ARC, the AI2 Reasoning Challenge," arXiv e-print, arXiv:1803.05457v1 [cs.AI], Mar. 14, 2018, 10 pages.

Devlin, et al., "BERT: Pre-training of Deep Bidirectional Transformers for Language Understanding," arXiv e-print, arXiv:1810.04805v2 [cs.CL], May 24, 2019, 16 pages.

Fedus, et al., "Switch Transformers: Scaling to Trillion Parameter Models with Simple and Efficient Sparsity," arXiv e-print, arXiv:2101.03961v1 [cs.LG], Jan. 11, 2021, 31 pages.

Gehring, et al., "Convolutional Sequence to Sequence Learning," in Proceedings of the 34th International Conference on Machine Learning, vol. 70, Aug. 2017, 10 pages.

He et al., "DeBERTa: Decoding-enhanced BERT with Disentangled Attention," arXiv e-print, arXiv:2006.03654v4 [cs. CL], Mar. 18, 2021, 21 pages.

Jacobs, et al., "Adaptive Mixtures of Local Experts," in Neural Computation, vol. 3, Issue 1, Mar. 1991, pp. 79-87.

Kingma, et al., "Adam: A Method for Stochastic Optimization," arXiv e-print, arXiv:1412.6980v9 [cs.LG], Jan. 30, 2017, 15 pages.

Lample, et al., "Cross-lingual Language Model Pretraining," arXiv e-print, arXiv:1901.07291v1 [cs.CL], Jan. 22, 2019, 10 pages.

Lepikhin, et al., "GShard: Scaling Giant Models with Conditional Computation and Automatic Sharding," arXiv e-print, arXiv:2006.16668v1 [cs.CL], Jun. 30, 2020, 35 pages.

Lewis, et al., "BART: Denoising Sequence-to-Sequence Pre-training for Natural Language Generation, Translation, and Comprehension," arXiv e-print, arXiv:1910.13461v1 [cs.CL], Oct. 29, 2019, 10 pages.

Lin, et al., "M6: A Chinese Multimodal Pretrainer," arXiv e-print, arXiv:2103.00823v4 [cs.CL], May 29, 2021, 12 pages.

Liu, et al., "On the Variance of the Adaptive Learning Rate and Beyond," arXiv e-print, arXiv:1908.03265v3 [cs.LG], Apr. 17, 2020, 14 pages.

Lu, et al., "Understanding the Difficulty of Training Transformers," arXiv e-print, arXiv:2004.08249v2 [cs.LG], Sep. 18, 2020, 18 pages.

Liu, et al., "Very Deep Transformers for Neural Machine Translation," arXiv e-print, arXiv:2008.07772v2 [cs.CL], Oct. 14, 2020 7 pages.

Liu, et al., "ROBERTa: A Robustly Optimized BERT Pretraining Approach," arXiv e-print, arXiv:1907.11692v1 [cs.CL], Jul. 26, 2019, 13 pages.

Ma, et al., "Modeling Task Relationships in Multi-task Learning with Multi-gate Mixture-of-Experts," in Proceedings of the 24th ACM SIGKDD International Conference on Knowledge Discovery & Data Mining, 2018, pp. 1930-1939.

Ma, et al., "SNR: Sub-Network Routing for Flexible Parameter Sharing in Multi-Task Learning," in Proceedings of the AAAI Conference on Artificial Intelligence, vol. 33, 2019, pp. 216-223.

Ott, et al., "Scaling Neural Machine Translation," arXiv e-print, arXiv:1806.00187v3 [cs.CL], Sep. 4, 2018, 9 pages.

Ott, et al., "fairseq: A Fast, Extensible Toolkit for Sequence Modeling," in Proceedings of NAACL-HLT 2019: Demonstrations, Jun. 2019, pp. 48-53.

Post, Matt, "A Call for Clarity in Reporting BLEU Scores," in Proceedings of the Third Conference on Machine Translation (WMT), vol. 1, Research Papers, Oct. 2018, pp. 186-191.

Radford, et al., "Language Models are Unsupervised Multitask Learners," available at https://paperswithcode.com/paper/language-models-are-unsupervised-multitask, 2019, accessed on Sep. 8, 2021, 24 pages.

Raffel, et al., "Exploring the Limits of Transfer Learning with a Unified Text-to-Text Transformer," arXiv e-print, arXiv:1910.10683v3 [cs.LG], Jul. 28, 2020, 67 pages.

Rasley, et al., "DeepSpeed: System Optimizations Enable Training Deep Learning Models with Over 100 Billion Parameters," in Proceedings of the 26th Acm Sigkdd International Conference on Knowledge Discovery & Data Mining, Aug. 2020, pp. 3505-3506.

Sennrich, et al., "Neural Machine Translation of Rare Words with Subword Units," arXiv e-print, arXiv:1508.07909v5 [cs.CL] Jun. 10, 2016, 11 pages.

Shazeer, et al., "Outrageously Large Neural Networks: The Sparsely-Gated Mixture-of-Experts Layer," arXiv e-print, arXiv:1701.06538v1 [cs.LG], Jan. 23, 2017, 19 pages.

Shen, et al., "Mixture Models for Diverse Machine Translation: Tricks of the Trade," arXiv e-print, arXiv:1902.07816v2 [cs.CL], May 24, 2019, 12 pages.

So, et al., "The Evolved Transformer," in Proceedings of the 36th International Conference on Machine Learning, PMLR, 2019, 10 pages.

Szegedy, et al., "Rethinking the Inception Architecture for Computer Vision," arXiv e-print, arXiv:1512.00567v3 [cs. CV], Dec. 11, 2015, 10 pages.

Vaswani, et al., "Attention Is All You Need," 31st Conference on Neural Information Processing Systems (NIPS 2017), 2017, 11 pages.

Wang, et al., "GLUE: A Multi-Task Benchmark and Analysis Platform for Natural Language Understanding," arXiv e-print, arXiv:1804.07461v3 [cs.CL], Feb. 22, 2019, 20 pages.

Wang, et al., "Learning Deep Transformer Models for Machine Translation," arXiv e-print, arXiv:1906.01787v1 [cs. CL], Jun. 5, 2019, 13 pages.

Wu, et al., "Pay Less Attention with Lightweight and Dynamic Convolutions," arXiv e-print, arXiv:1901.10430v2 [cs.CL]. Feb. 22, 2019, 14 pages.

Wu, et al., "Depth Growing for Neural Machine Translation," arXiv e-print, arXiv:1907.01968v1 [cs.CL], Jul. 3, 2019, 6 pages.

Yang, et al., "M6-T: Exploring Sparse Expert Models and Beyond," arXiv e-print, arXiv:2105.15082v5 [cs.LG], Aug. 9, 2021, 16 pages.

Alammar, Jay, "The Illustrated Transformer," available at http://jalammar.github.io/illustrated-transformer/, Github, Jun. 27, 2018, 23 pages.

Alammar, Jay, "The Illustrated GPT-2 (Visualizing Transformer Language Models)," available at https://jalammar.github.io/illustrated-gpt2/, Github, Aug. 12, 2019, 43 pages.

Zuo, et al., "Taming Sparsely Activated Transformer with Stochastic Experts," arXiv e-print,, arXiv:2110.04260v1 [cs. CL], Oct. 8, 2021, 16 pages.

Aghajanyan, et al., "Better Fine-Tuning by Reducing Representational Collapse," arXiv e-print, arXiv:2008.03156v1 [cs.LG], Aug. 6, 2020, 12 pages.

Conneau, et al., "Cross-lingual Language Model Pretraining," in Proceedings of the 33rd Conference on Neural Information Processing Systems (NeurIPS 2019), Dec. 2019, 11 pages.

Srivastava, et al., "Dropout: A Simple Way to Prevent Neural Networks from Overfitting," in Journal of Machine Learning Research, vol. 15, No. 56, 2014, pp. 1929-1958.

Jiang, et al., "SMART: Robust and Efficient Fine-Tuning for Pre-trained Natural Language Models through Principled Regularized Optimization," in Proceedings of the 58th Annual Meeting of the Association for Computational Linguistics, Jul. 2020, pp. 2177-2190.

Kim, et al., "Scalable and Efficient MoE Training for Multitask Multilingual Models," arXiv e-print, arXiv:2109.10465v1 [cs.CL], Sep. 22, 2021, 16 pages.

Lewis, et al., "BASE Layers: Simplifying Training of Large, Sparse Models," arXiv e-print, arXiv:2103.16716v1 [cs.CL], Mar. 30, 2021, 11 pages.

Roller, et al., "Hash Layers For Large Sparse Models," arXiv e-print, arXiv:2106.04426v3 [cs.LG], Jul. 20, 2021, 16 pages.

(56) References Cited

OTHER PUBLICATIONS

Zuo, et al., "Taming Sparsely Activated Transformer with Stochastic Experts," in arXiv e-prints, arXiv:2110.04260v3 [cs.CL], Feb. 3, 2022, 17 pages.

Riquelme, et al., "Scaling Vision with Sparse Mixture of Experts," in arXiv e-prints, arXiv:2106.05974v1 [cs.CV], Jun. 10, 2021, 43 pages.

\* cited by examiner

TRAINING SYSTEM 102

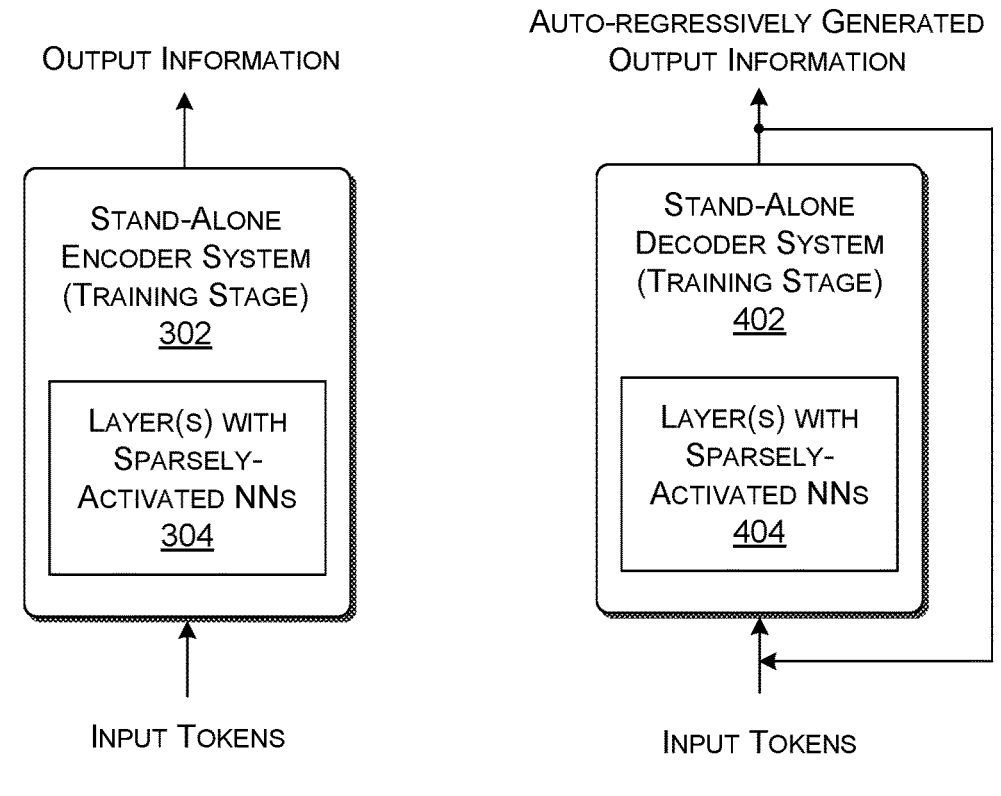

OUTPUT INFORMATION

STAND-ALONE
ENCODER SYSTEM
(TRAINING STAGE)
302

LAYER(S) WITH
SPARSELY-
ACTIVATED NNs
304

INPUT TOKENS

FIG. 3

AUTO-REGRESSIVELY GENERATED
OUTPUT INFORMATION

STAND-ALONE
DECODER SYSTEM
(TRAINING STAGE)
402

LAYER(S) WITH
SPARSELY-
ACTIVATED NNs
404

INPUT TOKENS

FIG. 4

AUTO-REGRESSIVELY GENERATED
OUTPUT INFORMATION

502

ENCODER SYSTEM
(TRAINING STAGE)
504

LAYER(S) WITH
SPARSELY-
ACTIVATED NNs
508

ENCODER
OUTPUT
INFORMATION

DECODER SYSTEM
(TRAINING STAGE)
506

LAYER(S) WITH
SPARSELY-
ACTIVATED NNs
510

INPUT TOKENS

FIG. 5

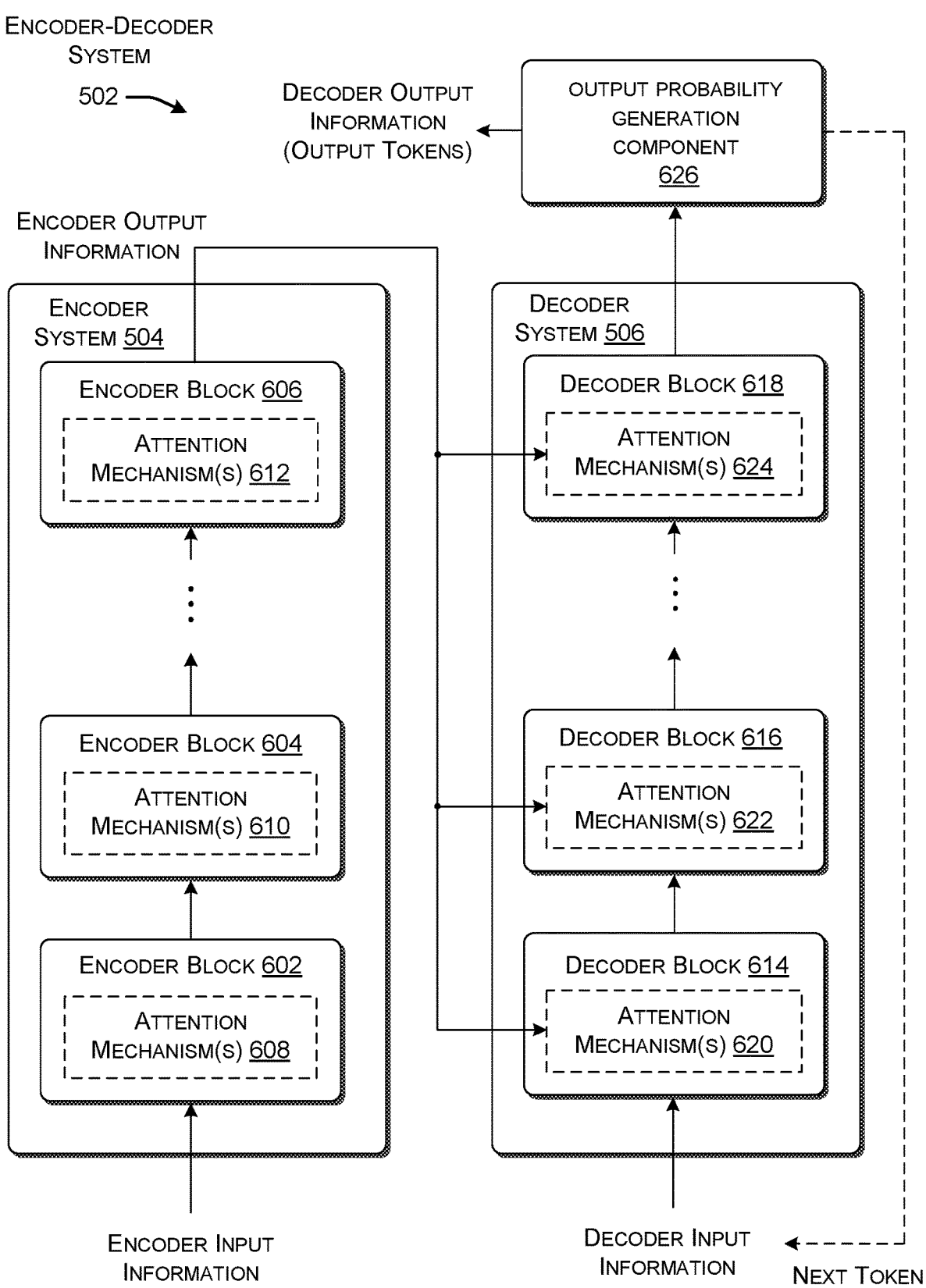

ENCODER-DECODER
SYSTEM

502

DECODER OUTPUT
INFORMATION
(OUTPUT TOKENS)

OUTPUT PROBABILITY
GENERATION
COMPONENT
626

ENCODER OUTPUT
INFORMATION

ENCODER
SYSTEM 504

ENCODER BLOCK 606

ATTENTION
MECHANISM(S) 612

ENCODER BLOCK 604

ATTENTION
MECHANISM(S) 610

ENCODER BLOCK 602

ATTENTION
MECHANISM(S) 608

DECODER
SYSTEM 506

DECODER BLOCK 618

ATTENTION
MECHANISM(S) 624

DECODER BLOCK 616

ATTENTION
MECHANISM(S) 622

DECODER BLOCK 614

ATTENTION
MECHANISM(S) 620

ENCODER INPUT
INFORMATION

DECODER INPUT
INFORMATION

NEXT TOKEN

FIG. 6

ILLUSTRATIVE
ENCODER BLOCK
702

ILLUSTRATIVE
DECODER BLOCK
802

Overview of Operation of the Training System 902

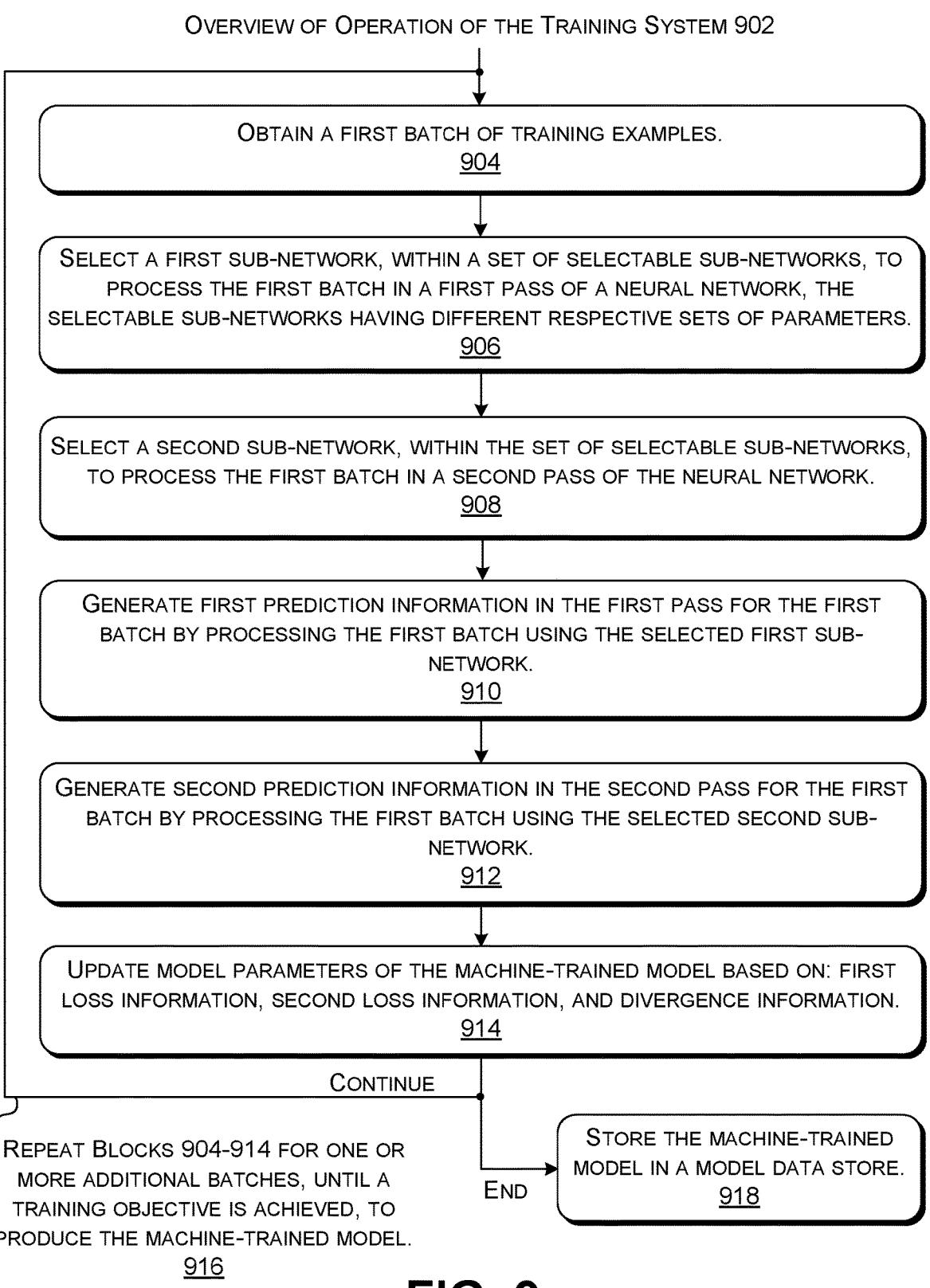

Obtain a first batch of training examples.
904

Select a first sub-network, within a set of selectable sub-networks, to process the first batch in a first pass of a neural network, the selectable sub-networks having different respective sets of parameters.
906

Select a second sub-network, within the set of selectable sub-networks, to process the first batch in a second pass of the neural network.
908

Generate first prediction information in the first pass for the first batch by processing the first batch using the selected first sub-network.
910

Generate second prediction information in the second pass for the first batch by processing the first batch using the selected second sub-network.
912

Update model parameters of the machine-trained model based on: first loss information, second loss information, and divergence information.
914

Continue

Repeat Blocks 904-914 for one or more additional batches, until a training objective is achieved, to produce the machine-trained model.
916

End

Store the machine-trained model in a model data store.
918

FIG. 9

OVERVIEW OF OPERATION OF THE PRODUCTION SYSTEM 1002

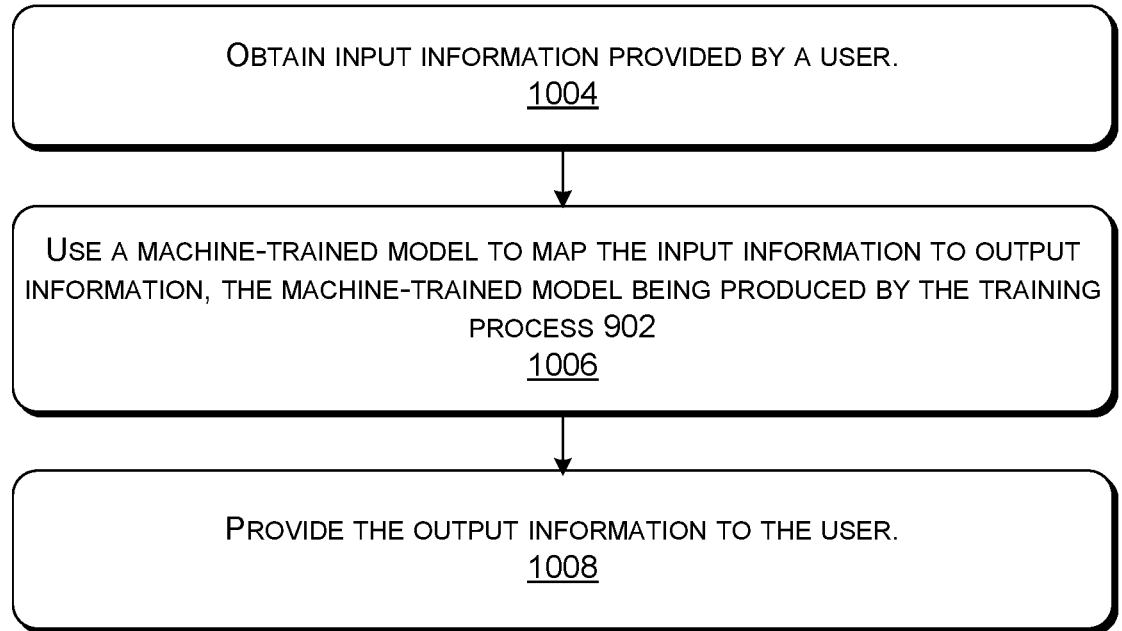

OBTAIN INPUT INFORMATION PROVIDED BY A USER.
1004

USE A MACHINE-TRAINED MODEL TO MAP THE INPUT INFORMATION TO OUTPUT INFORMATION, THE MACHINE-TRAINED MODEL BEING PRODUCED BY THE TRAINING PROCESS 902
1006

PROVIDE THE OUTPUT INFORMATION TO THE USER.
1008

FIG. 10

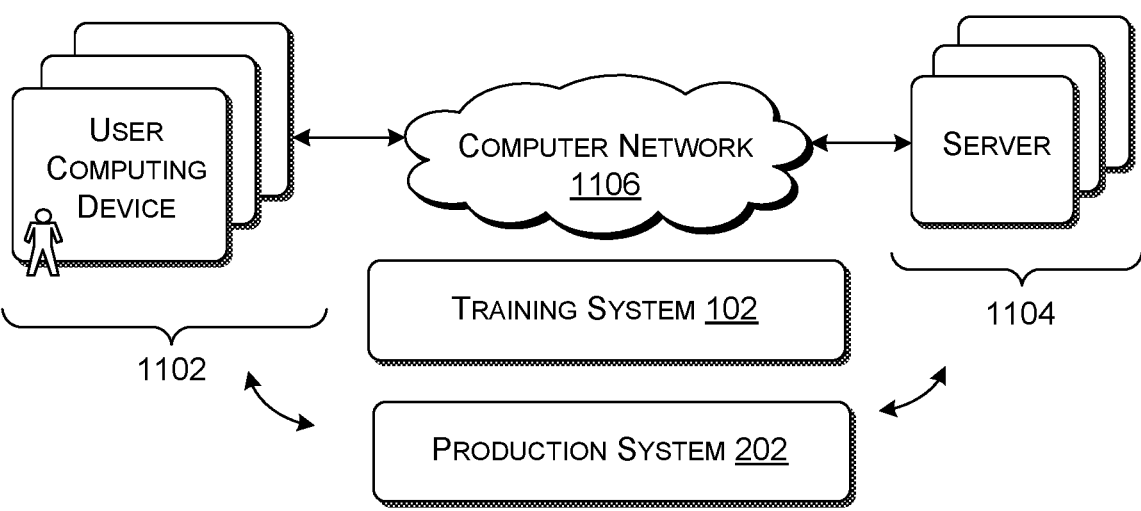

USER COMPUTING DEVICE

COMPUTER NETWORK
1106

SERVER

TRAINING SYSTEM 102

PRODUCTION SYSTEM 202

TRAINING A NEURAL NETWORK HAVING SPARSELY-ACTIVATED SUB-NETWORKS USING REGULARIZATION

This application claims the benefit of U.S. Provisional Application No. 63/244,714 (the '714 applications), filed on Sep. 15, 2021. The '714 application is incorporated by reference herein in its entirety.

BACKGROUND

A large neural network uses a large number of parameters that are produced in a machine-training process. It requires a significant amount of computing resources to train these parameters, and once the neural network is fully trained, to apply these parameters in a production system. These computing resources consumed in the production system include processor resources, memory resource, power, etc. A large neural network also may increase the amount of time that is required to process a user's input query or other input data. A developer is therefore faced with the dual challenge of implementing a large neural network within given resource budgets and within permissible latency thresholds. The last constraint is particularly daunting, as customers of some online services demand answers to their queries within fractions of a second.

The industry has proposed the use of sparsely-activated neural networks to address some of the above challenges. A sparsely-activated neural network devotes different sets of machine-trained parameters to process different respective inputs. This is in contrast to a densely-activated neural network, which applies the same set of input-agnostic parameters to all inputs. A sparsely-activated network can accommodate a very large number of parameters, while ensuring that its forward inference pass applies the same number of floating point operations (FLOPs). Nevertheless, sparsely-activated neural networks introduce additional complexity in the design of neural networks. This added complexity, in turn, poses new technical problems.

SUMMARY

A training technique trains a neural network having sparsely-activated sub-networks. It does so by processing plural batches of training data in two respective passes of the neural network, yielding first prediction information and second prediction information. For each batch, the technique randomly assigns a particular sub-network in the first pass to process the batch, and randomly assigns a different particular sub-network in the second pass to process the batch. Over the course of training, the technique attempts to minimize loss information and divergence information. The loss information describes the difference between the first prediction information and ground-truth information, and the difference between the second prediction information and the ground-truth information. The divergence information describes the divergence of the first prediction information from the second prediction information (and vice versa). The use of divergence information helps equalize and regularize the training among different sub-networks, preventing any single sub-network from receiving a proportionally greater amount of training than other sub-networks. The technique can produce an inference-stage model for use in a production system by arbitrarily selecting at least one of the trained sub-networks in the neural network.

Traditional gating mechanisms, by contrast, use machine-trained logic to route particular inputs to particular parts of the neural network (wherein these parts are referred to as "experts" in the literature). The above-summarized technique eliminates the use of these gating mechanisms in both the training stage and inference stage. By doing so, the technique eliminates the load-balancing problems associated with these gating mechanisms. It also eliminates the algorithmic complexity of these gating mechanism. The Detailed Description sets forth the studies that led to the conclusion that it would be acceptable and beneficial to remove the traditional gating mechanisms of sparsely-activated neural networks.

Overall, the technique produces a compact machine-trained model that offers superior performance compared to other machine-trained models of the same size, and even larger machine-trained models. These characteristics ensue, in part, from the use of sparsely-activated sub-networks in the training stage (which allows for expansion in the number of parameters), coupled with the regularization constraints imposed by the training objective.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 shows a stand-alone encoder system, which is one manifestation of the machine-trained model trained by the training system of FIG. 1.

FIG. 4 shows a stand-alone decoder system, which is another manifestation of the machine-trained model trained by the training system of FIG. 1.

FIG. 5 shows an encoder-decoder system, which is another manifestation of the machine-trained model trained by the training system of FIG. 1.

FIG. 6 shows further non-limiting details of some implementations of the encoder-decoder system of FIG. 5.

FIG. 9 is a flowchart that shows one manner of operation of the training system of FIG. 1.

FIG. 10 is a flowchart that shows one manner of operation of the production system of FIG. 1.

FIG. 11 shows computing equipment that can be used to implement the systems shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a training system for training a model, and a production system for applying the machine-trained model. Section B sets forth illustrative methods which explain the operation of the systems of Section A. And Section C describes illustrative computing functionality that can be used to implement any aspect of the features described in Sections A and B.

A. Illustrative Computing System

Figure 1:
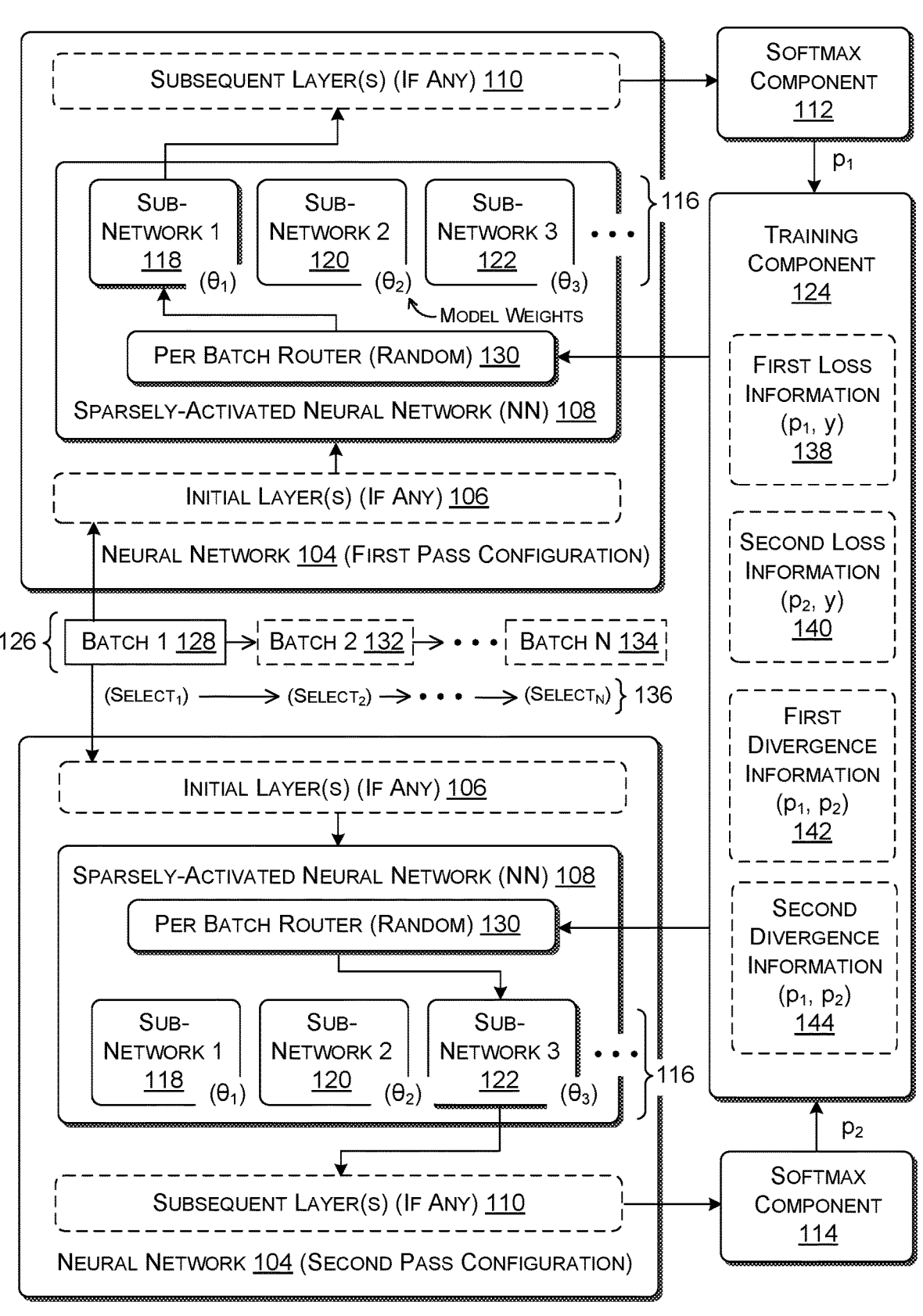
FIG. 1 shows an illustrative training system for producing a machine-trained model.

FIG. 1 shows an illustrative training system 102 for producing parameters that define a machine-trained model. The parameters also define the weighting values that govern the operation of a multi-level neural network 104. The neural network 104 may be regarded as the functioning manifestation of the machine-trained model that runs on computing equipment.

To produce the parameters, the training system 102 processes successive batches of training examples in two passes of the neural network 104. The training system 102 can execute the two passes in different ways. In some implementations, the training system 102 can run the two passes in temporal series, that is, one after the other. In other implementations, the training system 102 can run the two passes at the same time, e.g., by using plural instances of the neural network 104. FIG. 1 shows the configuration of the neural network 104 in the first pass at the top of the figure, and the configuration of the neural network 104 in the second pass at the bottom of the figure. While FIG. 1 shows the two instances of the neural network 104 to facilitate explanation, note that these instances share the same parameters at each stage in the training process, and correspond to the same underlying neural network 104.

FIG. 1 depicts the neural network 104 in high-level form to indicate that the neural network 104 can have a wide variety of different architectures and sizes. For instance, the neural network 104 includes one or more initial layers 106, at least one sparsely-activated neural network (NN) 108, and one or more subsequent layers 110. The neural network 104 operates on input information in a pipeline that includes the initial layer(s) 106, the sparsely-activated neural network 108, and the subsequent layer(s) 110, in that order. A softmax component 112 operates on output information generated by the neural network 104 in the first pass, to produce first prediction information ($p_1$). That is, the softmax component 114 generates the first prediction information using a normalized exponential function. The first prediction information describes the probability of predictions made by the neural network 104 in the first pass. A softmax component 114 operates on output information generated by the neural network 104 in the second pass, to produce second prediction information ($p_2$). The second prediction information describes the probability of predictions made by the neural network 104 in the second pass.

Subsequent figures and explanation will set forth illustrative implementations of the above-described neural network mechanisms. For example, the initial layer(s) 106 of the neural network 104 can include an embedding layer, an attention mechanism, an add-and-normalize mechanism, etc. The sparsely-activated neural network 108 can include a set 116 of sub-networks (118, 120, 122 . . . ), only a subset of which are activated for any given forward pass. The subsequent layer(s) 110 may represent any additional processing mechanisms which follow the sparsely-activated neural network 108. For example, the neural network 104 can include plural processing blocks that include the same type of processing mechanisms described above (e.g., attention mechanisms, add-and-normalize mechanisms, sparsely-activated neural networks, and so on).

In some implementations, each sub-network in the sparsely-activated neural network 116 corresponds to a feed-forward neural network, e.g., a two-layer feed-forward neural network that uses any type of activation function (e.g., ReLU). Different sub-networks in the sparsely-activated neural network 108 are governed by different subsets of parameters. For example, FIG. 1 shows that the sub-networks (118, 120, 122, . . . ) that make up the sparsely-activated neural network 108 are governed by collections of parameters $\theta_1$, $\theta_2$, and $\theta_3$, etc., respectively, where these subsets are not the same.

A training component 124 manages the training of the machine-trained model. It does so by feeding successive batches of 126 of training examples to the neural network 104, for the first and second passes. Each batch includes a collection of training examples, such as a set of input queries or sentences to be processed by the neural network 104. For each batch, the training component 124 randomly selects a particular sub-network in the sparsely-activated neural network 108 of the neural network 104 for the first pass, and another sub-network in the sparsely-activated neural network 108 for the second pass. For example, for a first batch 128, the training component 124 randomly selects the first sub-network 118 for the first pass, and randomly selects the third sub-network 122 for the second pass. Thereafter, the neural network 104 uses the first sub-network 118 to process the training examples in the first batch 128 for the first pass, and the neural network 104 uses the third sub-network 122 to process the training examples in the first batch 128 for the second pass. After the first batch 128 has been processed in this manner, the training component 124 updates the parameters of the machine-trained model using information that has been collected in the course of processing the first batch 128. More specifically, the training component 124 can execute the updating operation using any training technique, such as stochastic gradient descent and backpropagation. Note that it will update all of the parameters that govern the operation of the neural network 104, except that it will not update the parameters $\theta_2$ that govern the operation of the second sub-network 120, because the second sub-network 120 was not involved in processing the first batch 128. More generally, this is true for any sub-network that did not contribute to the processing of a batch.

FIG. 1 shows that the sparsely-activated neural network 108 includes some mechanism 130 for selecting the first sub-network 118 for the first pass, and selecting the third sub-network 122 for the second pass. This mechanism 130 enables the selected sub-network(s) and disables the non-selected sub-network(s). For instance, the mechanism 130 may correspond to a multiplexer that receives instructions from the training component 124, and based thereon, routes information flowing into the sparsely-activated neural network 108 to the selected sub-network.

The training component 124 continues with the above process for successive batches (132, . . . , 134) in the training data set. At the commencement of each batch, the training component 124 randomly selects new sub-networks for use in the first and second passes. FIG. 1 illustrates a succession 136 of these selections. For each selection, the training component 124 can optionally ensure that it selects two different sub-networks for the two passes. At the end of each batch, the training component 124 updates the machine-trained model based on the first and second prediction information that has been generated for the batch. This process continues until a prescribed training objective is reached, e.g., until a predetermined accuracy threshold is reached.

In some implementations, the training component 124 applies an objective function that seeks to minimize a cost measure that reflects the combined effects of first loss information 138, second loss information 140, first divergence information 142, and second divergence information 144. The first loss information 138 represents the difference between the first prediction information $p_1$ and ground-truth information y. The ground-truth information y establishes what is accepted as the correct transformation of the training examples in each batch. For example, assume that the purpose of the machine-trained model is to translate text from a first natural language to a second natural example. An individual training example x in a batch of training examples can include a sentence in the first natural language. The prediction information for this example x identifies a translated sentence predicted by the machine-trained model. The ground-truth y for this training example x describes the translation of the sentence that is considered correct. The second loss information 140 represents the difference between the second prediction information $p_2$ and the ground-truth information y. The first divergence information 142 represents the divergence of the first prediction information from the second prediction information. The second divergence information 144 represents the divergence of the second prediction information relative to the first prediction information.

According to some implementations, the training component 124 performs the above-summarized cost optimization using the following objective function:

$$\min \sum_{(x,y)\in D} \ell(x, y) = CE(p_1; y) + CE(p_2; y) + \frac{\alpha}{2}(KL(p_1\|p_2) + KL(p_2\|p_1)). \quad (1)$$

this non-limiting formulation, CE represents a cross-entropy loss measure, and KL represents Kullback-Leibler divergence measure. The two CE terms in Equation (1) represent the first and second loss information (138, 140), respectively. The two KL terms in Equation (1) represent the first and second divergence information (142, 144), respectfully. Note that, in the context of Equation (1), $p_1$, $p_2$, and y represent distributions over an entire batch of training examples in the training data set. For example, the first KL term represents a divergence of a collection of predictions generated by the first pass of the neural network 104, relative to a collection of predictions generated by the second pass of the neural network 104. In view of the fact that Equation (1) is used to update the machine-trained model for each successive training batch, Equation (1) also conveys the overall training objective applied to the entire training data set D.

The use of divergence information (142, 144) helps to ensure that training is equally applied to the sub-networks 116 in the neural network 104 being trained. In other words, the divergence information (142, 144) prevents any single sub-network or plural sub-networks from receiving most of the training, at the expense of other sub-networks that receive comparatively little training. It performs this task by penalizing those instances in which the distribution of the first prediction information varies considerably from the distribution of the second prediction information. The symbol α represents a scaling factor that determines the extent of influence of the regularization component of Equation (1).

When training is complete, the developer can produce a final machine-trained model by arbitrarily selecting one of the sub-networks in the sparsely-activated neural network 108. For example, the training system 102 can produce a final machine-trained model that includes parameters for just the first sub-network 118, along with the parameters which are used The training system 102 as a whole includes various features that depart from traditional neural networks with sparsely-activated resources. First, the neural network 104 being trained in FIG. 1 does not make use of a machine-learned gating mechanism that routes particular inputs to particular "experts," where the term "expert" is used in the technical literature to refer to a sparsely-activated resource. Rather, the training system 102 randomly assigns sub-networks to batches. Second, the neural network 104 includes provisions that prevent unbalanced training among sub-networks. These provisions include the protocol by which the neural network 104 processes each batch in two separate passes, using different respective configurations of the sparsely-activated neural network 108. The provisions also include the use of a training component 124 that attempts to minimize the divergence in prediction information generated by the two passes of the neural network 104.

The decision to remove the kind of gating mechanisms found in traditional sparsely-activated neural networks is based insight gained through a study of these gating mechanisms. Based on the study, the inventors reached the following conclusions. (1) The routing strategy implemented by traditional gating mechanisms does not achieve markedly different results than randomly routing inputs to experts. (2) Traditional training systems do not create experts having task-specific expertise, which means that the gating mechanisms will not route inputs to experts based on domain-related considerations. These observations are surprising and counterintuitive, since they run contrary to some of the core assumption that underpin traditional sparsely-activated neural networks. For instance, an expert is referred to as an expert precisely because it is assumed that it has acquired specialized expertise in the training process. The study found that this assumption is not valid.

Overall, the machine-trained model produced by the training system 102 offers superior performance to other machine-trained models of the same size. It also offers superior performance to some neural networks of even much greater size. More specifically, the machine-trained model can improve its generalization performance by greatly expanding the number of parameters in the training stage, through the use of sparsely-activated neural networks. The machine-trained model also improves its generalization performance as a result of the regularization constraint imposed by the training system 102. Generalization performance refers to an extent to which the neural network 104 successfully processes new input information, beyond that specified in the training examples used to train the neural network 104.

The machine-trained model is also relatively compact compared to some densely-activated neural networks. For instance, while the training stage involves use of a large collection of parameters due to the use of the sparsely-activated neural network 108, the production-stage manifestation of the machine-trained model only includes the contribution of one of the sub-networks in the sparsely-activated neural network 108, along with the parameters associated with other parts of the neural network 104. The size and complexity of the machine-trained model is also reduced by virtue of the fact that it eliminates the use of a traditional gating mechanism.

The training system 102 can be varied in different ways. A non-exhaustive list of possible variations follows.

Variation 1. In the example described above, the training system 102 processes each training batch in two passes of the neural network 104. In other implementations, the training system 102 can process each batch in three or more passes of the neural network.

Variation 2. In the example described above, the sparsely-activated neural network 108 in the neural network 104 selects a single sub-network in the training stage. In other implementations, the sparsely-activated neural network 108 can select two or more sub-networks. A following layer can sum together the results of the chosen sub-networks.

Variation 3. In the example described above, the training system 102 performs training on a batch-by-batch basis. In other implementations, the training system 102 can update the machine-trained model on a more frequent basis, such as after processing each training example. In this context, the batch may be regarded as composed of a single training example.

Variation 4. In the examples described above, the training component 124 uses a combination of cross-entropy and Kullback-Leibler divergence in Equation (1). In other implementations, the training component 124 can use other measures to express loss information and divergence information. For example, other implementations can use a Wasserstein metric instead of a KL divergence measure.

Variation 5. In the example described above, the training system 102 produces a production-stage machine-trained model by selecting a single fully-trained sub-network. In other implementations, the production system can retain the sparsely-activated neural network 108, which operates in the production system in same manner as in the training stage. That is, the production system can randomly select one of the sub-networks in the sparsely-activated neural network 108, just like in the training system 102.

Variation 6. In other implementations, the production system can randomly select two or more sub-networks. A subsequent layer can sum together the results of the two or more chosen sub-networks. Alternatively, the production system can run plural full passes with different sub-networks, like the case of the training system 102. A subsequent component can average the results of the plural passes.

Figure 2:
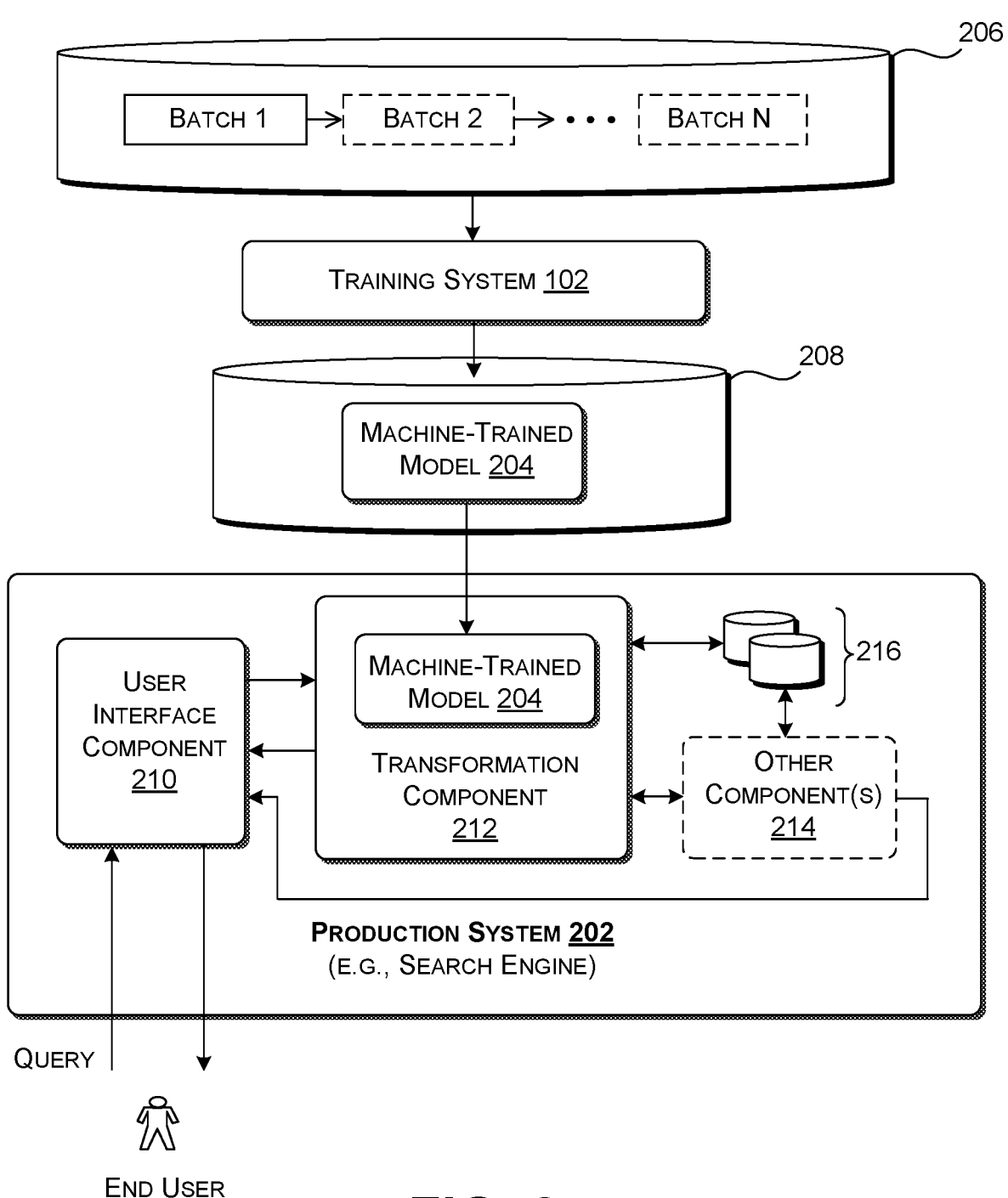
FIG. 2 shows a production system that uses the machine-trained model produced by the training system of FIG. 1.

FIG. 2 shows a production system 202 that uses a machine-trained model 204 produced by the training system 102. The training system 102 serially processes batches of training examples stored in a training data store 206 in the manner described above. When training is completed, the training system 102 stores the machine-trained model 204 in a model data store 208. The production system 202 applies the machine-trained model 204 to provide some service to an end user. The following explanation provides a non-exhaustive list of some possible services provided by the production system 202.

In some implementations, the production system 202 includes a user interface component 210 for receiving input information from the user. In some implementations, the input information takes the form of a sequence of one or more words (or other linguistic tokens). For example, the input information may express a query that the user submits to a search engine, where the query includes one or more query terms. A transformation component 212 uses the machine-trained model 204 to transform the input information into some other form. For example, the transformation component 212 can map the input information into keyword information, made up of one or more keywords. Another component 214 can use the identified keyword information as a key to interrogate an index 216, to find one or more target items that match the keyword information. The user interface component 210 can then respond to the user's query by providing output information that identifies one or more matching target items. For example, assume that the target items correspond to online advertisements. The user interface component 210 can respond to the user's query by serving the matching advertisements to the user. In other cases, the target items correspond to matching websites, documents, etc. Here, the user interface component 210 can deliver a search results page with search snippets that identify the matching target items.

The transformation component 212 can perform many other mapping operations for different applications. For instance, in another application, the transformation component 212 can reformulate textual information provided by a user into another form. For example, the transformation component 212 can map an abbreviated description of a product (e.g., as provided by one or more keywords or other seed information) into a more fulsome description of the product (e.g., as provided by one or more sentences, a title, etc.). In another application, the transformation component 212 can perform the opposite transformation by condensing a fulsome description into a more condensed expression. In another application, the transformation component 212 can translate text in a first natural language to text in another language. These examples are cited by way of example, not limitation; still other applications of the production system 202 are possible.

Further, the examples described above involved the transformation of text from one form to another. In other implementations, the transformation component 212 can operate on non-linguistic image, such image information, or a combination of linguistic information and non-linguistic information. For example, in one application, the transformation component 212 can map an input image from one form to another form. In another application, the transformation component 212 can map an input image into a textual caption that describes the content of the input image. Again, these applications are merely illustrative in nature; many other applications of the production system 202 are possible.

FIG. 3 shows a stand-alone encoder system 302, which is one manifestation of the machine-trained model 204 trained by the training system 102 of FIG. 1. The encoder system 302 maps a string of input tokens into output information, which provides hidden state representations for the respective input tokens. Any other "upstream" component (not shown) can perform further operations on the output information. For example, a classification system (not shown) can use a machine-trained classification model (not shown) to classify one or more of the input tokens based on the output information associated with those input tokens. In the training stage, the encoder system 302 can include one or more sparsely-activated neural networks 304 of the type described in FIG. 1. The training system 102 can assign different weights to each set of sub-networks positioned at different respective levels.

FIG. 4 shows a stand-alone decoder system 402, corresponding to another manifestation of the machine-trained model 204 trained by the training system 102 of FIG. 1. The decoder system 402 can accept one or more input tokens.

Based thereon, the decoder system 402 auto-regressively generates an output token, representing the most probable token to follow the sequence of input tokens. For example, upon being fed an input query "<start> Prius 2019 low miles <end>," the decoder system 402 can predict the next token, which may correspond to a first token of keyword information associated with the query. Upon predicting each output token, the decoder system 402 adds it to the end of the input tokens, upon which the decoder system 402 again predicts the next output token to follow the current set of input tokens. This process continues until the decoder system 402 predicts that the next token is an end-of-sequence token. In the training stage, the decoder system 402 can include one or more sparsely-activated neural networks 404 of the type described in FIG. 1. The training system 102 can assign different weights to different sets of sub-networks positioned at different respective levels.

FIG. 5 shows an encoder-decoder system 502, corresponding to another manifestation of the machine-trained model 204 trained by the training system 102 of FIG. 1. The encoder-system 502 includes an encoder system 504 and a decoder system 506 that function in much the same manner as the standalone encoder system 302 and the standalone decoder system 402, except that, in the encoder-decoder system 502, the encoder system 504 feeds its encoder output information to the decoder system 506. The decoder system 506 auto-regressively generates its output information based on the encoder output information. In the training stage, the encoder system 504 can include one or more sparsely-activated neural networks 508 of the type described in FIG. 1. Alternatively, or in addition, the decoder system 506 can include one or more sparsely-activated neural networks 510 of the type described in FIG. 1. Like the examples set forth above, the training system 102 can assign different weights to different sets of the sub-networks positioned at different respective levels.

FIG. 6 shows further details of the encoder-decoder system 502 of FIG. 5 in accordance with some implementations. The encoder-decoder system 502 incorporates some aspects of a transformer-based architecture. Background information on the standalone topic of the transformer architecture is provided in the seminal paper by VASWANI, et al., "Attention Is All You Need," in 31st Conference on Neural Information Processing Systems (NIPS 2017), 2017, 11 pages, which is incorporated by reference herein. However, the use of the transformer architecture is merely representative; the principles set forth herein can be implemented using other types of neural networks, such as convolutional neural networks (CNNs), recurrent neural networks (RNNs), etc.

The encoder-decoder system 502 includes the encoder system 504 and the decoder system 506. The encoder system 504 receives encoder input information in the form of a series of input vectors. An input encoding component (not shown) produces the input vectors by converting a series of tokens that compose the linguistic information supplied to the encoder system 504 into respective vectors (e.g., using a lookup table, machine-trained model, etc.), and then adding position information to the respective vectors which describes their position within the sequence of input vectors. The encoder system 504 maps the encoder input information into encoder output information using a pipeline of encoder blocks (602, 604, . . . , 606), with each encoder block receiving its input information from a preceding encoder block (if any). The encoder blocks (602, 604, . . . , 606) include respective attention mechanisms (608, 610, . . . , 612).

The decoder system 506 performs its processing based on both decoder input information and the encoder output information. Since the decoder system 506 produces the generated sequence using auto-regression, the decoder input information includes, at any given time, the set of tokens that have been predicted thus far. The decoder system 506 uses a pipeline of decoder blocks (614, 616, . . . , 618) to produce decoder output information, with each decoder block receiving input information from a preceding decoder block (if any). The decoder blocks (614, 616, . . . , 618) can include respective attention mechanisms (620, 622, . . . , 624).

An output probability generation component 626 can use a combination of a linear transformation operation and the softmax function to map the decoder output information into a probability distribution. The probability distribution identifies the probability associated with each word in an identified vocabulary. A search heuristic component can use any search heuristic to select from among the candidate tokens. In a greedy search heuristic, the search heuristic component selects the token having the highest probability at each time step. In a beam search heuristic, the search heuristic component selects a plurality of tokens having the highest probabilities.

Consider the operation of auto-regression for the case in which the greedy search heuristic is used. Upon predicting the next token, the decoder system 506 adds this predicted token to the decoder input information, to produce updated decoder input information. The decoder system 506 then repeats the above-described operations on the basis of the updated decoder input information, to produce a next token in the generated sequence. The decoder system 506 adds this next token to the decoder input information, to produce yet another instance of updated decoder input information. The decoder system 506 continues in this recursive manner until the output probability generation component 626 predicts that the next token is an end-of-sequence token. For the case in which the beam search heuristic is used, the decoder system 506 performs the above tasks with respect to plural paths through a token search space.

Figures 7, 8:
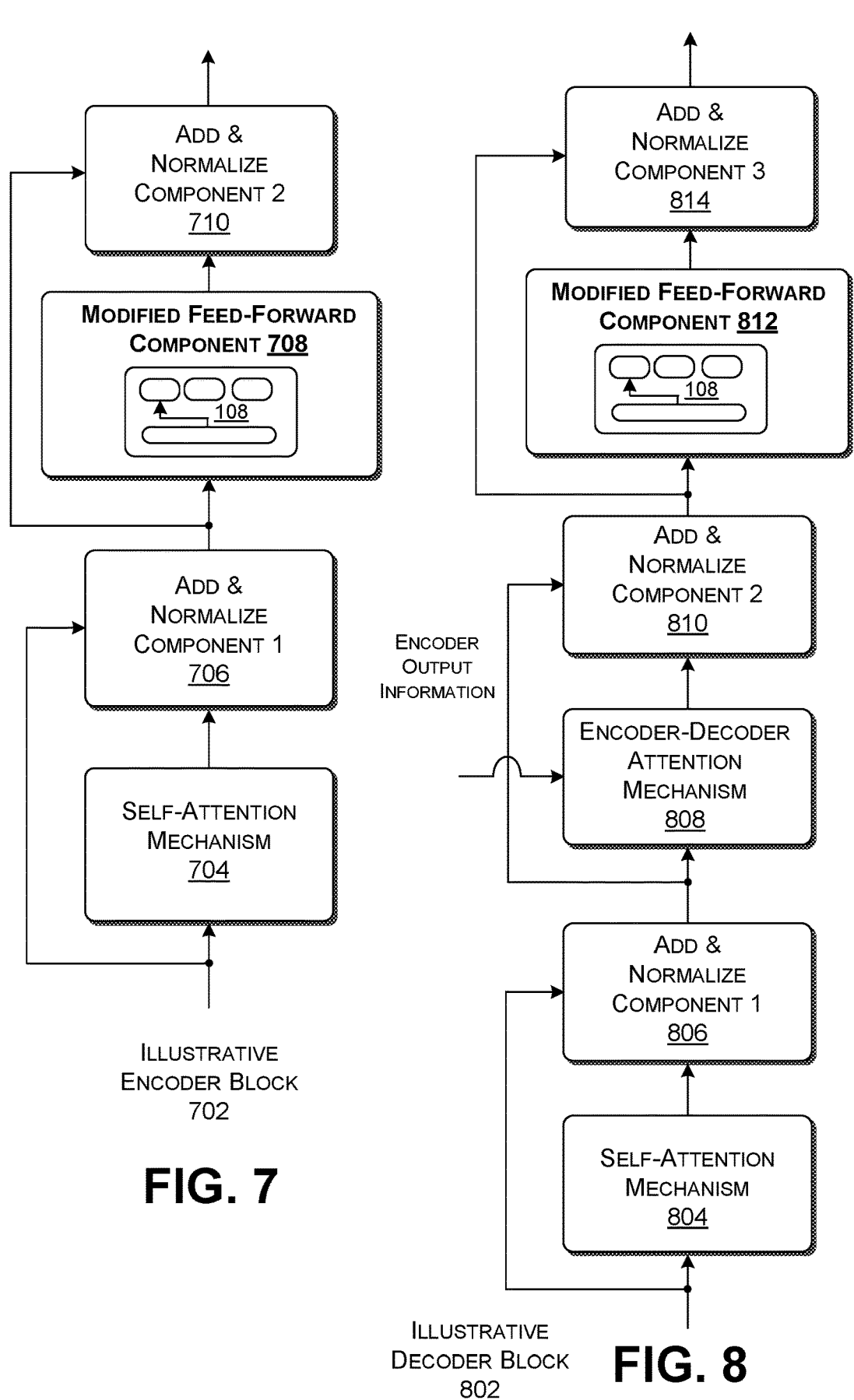
FIG. 7 shows further non-limiting details of an encoder block used in the encoder-decoder system of FIG. 6.
FIG. 8 shows further non-limiting details of a decoder block used in the encoder-decoder system of FIG. 6.

FIG. 7 shows an illustrative and non-limiting encoder block 702. It includes a self-attention mechanism 704, an add-&-normalize component 706, a modified feed-forward component 708, and another add-&-normalize component 710. The self-attention mechanism 704 performs self-attention. The first add-&-normalize component 706 adds the input information fed to the self-attention mechanism 704 to the output information provided by the self-attention mechanism 704 (thus forming a residual connection), and then performs layer-normalization on that result. Layer normalization entails adjusting values in a layer based on the mean and deviation of those values in the layer. In a training stage implementation, the modified feed-forward component 708 includes the kind of sparsely-activated neural network 108 described above. As such, the modified feed-forward component 708 uses a set of sub-networks, some of which may be used in a current forward pass, and others which are not used. Note that FIG. 7 refers to the feed-forward component 708 as a "modified" feed-forward component because the traditional transformer uses a single feed-forward network, not a set of sparsely-activated sub-networks. The second add-&-normalize component 710 performs the same function as the first add-&-normalize component 706.

In some implementation, each attention mechanism in the self-attention mechanism 704 generates attention information using the following equation:

$$attn(Q, K, V) = \text{softmax}\left(\frac{QK^T}{\sqrt{d}}\right)V. \qquad (2)$$

Query information Q is produced by multiplying the input vectors associated with the encoder input information by a query weighting matrix $W^Q$. Key information K and value information V are produced by multiplying the same input vectors by a key weighting matrix $W^K$ and a value weighting matrix $W^V$, respectively. Equation (2) involves taking the dot product of Q by the transpose of K, and then dividing that dot product by a scaling factor $\sqrt{d}$, where d may represent the dimensionality of the machine-learned model. This yields a scaled result. Equation (2) then involves computing the softmax of the scaled result, and then multiplying the result of the softmax operation by V. From a more general perspective, the self-attention mechanism 704 uses Equation (2) to determine the amount of focus (attention) that should be placed on each part of the input information, when processing a particular part of the input information under consideration.

FIG. 8 shows an illustrative and non-limiting example of a decoder block 802. The decoder block 802 includes a self-attention mechanism 804, an add-&-normalize component 806, encoder-decoder attention mechanism 808, another add-&-normalize component 810, a modified feed-forward component 812, and another add-&-normalize component 814. The self-attention mechanism 804 performs masked self-attention on the decoder input information fed to it using Equation (2). The self-attention mechanism 804 performs masking so that positions in a sequence after a last-predicted token (which are unknown at this time) do not bias its results.

On the other hand, the encoder-decoder attention mechanism 808 performs cross-attention based on the output information generated by the encoder system 504 and the output information supplied by the preceding component in the decoder block 802 (i.e., the add-&-normalize component 806). The encoder-decoder attention mechanism 808 also uses Equation (2) to perform its functions, but the encoder-decoder attention mechanism 808 uses the encoder output information to generate the key formation K and the value information V, and uses the output information fed to it by the add-&-normalize component 806 to generate the query information Q. The add-&-normalize components (806, 810, 814) and the modified feed-forward component 812 perform the same functions described above for the encoder block 702.

More specifically, in a training stage implementation, the modified feed-forward component 812 includes the kind of sparsely-activated neural network 108 described above. As such, the modified feed-forward component 812 uses a set of sub-networks, some of which may be used in a current forward pass, and others which are not used. Note that FIG. 8 refers to the feed-forward component 812 as a "modified" feed-forward component because the traditional transformer uses a single feed-forward network, not a set of sparsely-activated sub-networks.

In the inference stage of the production system 202, the modified feed-forward component 708 of FIG. 7 uses a single chosen sub-network. Similarly, the modified feed-forward component 812 of FIG. 8 uses a single chosen sub-network.

In some implementations, the encoder-decoder system 502 can interleave transformer blocks that include traditional feed-forward neural networks with transformer blocks that replace the traditional feed-forward neural networks with sparsely-activated neural networks of the type shown in FIG. 1. In some implementations, the encoder-decoder system 502 uses sparsely-activated neural networks in the decoder system 506, but not the encoder system 504 (or vice versa). Still other selective deployments of sparsely-activated neural networks within the encoder-decoder system 502 are possible.

B. Illustrative Processes

FIGS. 9 and 10 show processes that explain the operation of the training system 102 and production system 202 of Section A in flowchart form, according to some implementations. Since the principles underlying the operation of the systems (102, 202) have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In some implementations, the blocks shown in the flowcharts that pertain to processing-related functions are implemented by the hardware logic circuitry described in Section C, which, in turn, can be implemented by one or more hardware processors and/or other logic units that include a task-specific collection of logic gates.

FIG. 9 shows a process 902 for generating the machine-trained model 204. In block 904, the training system 102 obtains the first batch 128 of training examples. In block 906, the training system 102 selects the first sub-network 118, within the set of selectable sub-networks 116, to process the first batch 128 in a first pass of the neural network 104, the selectable sub-networks 116 having different respective sets of parameters. In block 908, the training system 102 selects the second sub-network 122, within the set of selectable sub-networks 116, to process the first batch 128 in a second pass of the neural network 104. In block 910, the training system 102 generates first prediction information in the first pass for the first batch 128 by processing the first batch 128 using the selected first sub-network 118. In block 912, the training system 102 generates second prediction information in the second pass for the first batch 128 by processing the first batch 128 using the selected second sub-network 122. In block 914, the training system 102 updates model parameters of the machine-trained model 204 for the first batch 128 based on: first loss information, second loss information, and divergence information. The first loss information describes a difference between the first prediction information and ground-truth information. The second loss information describes a difference between the second prediction information and the ground-truth information. The divergence information describes a divergence between the first prediction information and the second prediction information. In block 916, the training system 102 repeats block 904 to 914 for one or more additional batches, until a training objective is achieved, to produce the machine-trained model. In block 918, the training system 102 stores the machine-trained model 204 in a model data store 208.

FIG. 10 shows a process 1002 for applying the machine-trained model 204. In block 1004, the production system 202 obtains input information provided by a user. In block 1006, the production system 202 uses the machine-trained model 204 to map the input information to output information. In block 1008, the production system 202 provides the output information to the user. The machine-trained model 204 is produced using the process 902 of FIG. 9.

C. Representative Computing Functionality

FIG. 11 shows an example of computing equipment that can be used to implement any of the systems summarized above. The computing equipment includes a set of user computing devices 1102 coupled to a set of servers 1104 via a computer network 1106. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1106 can be implemented as a local area network, a wide area network (e.g., the Internet), one or more point-to-point links, or any combination thereof.

FIG. 11 also indicates that the training system 102 and the production system 202 can be spread across the user computing devices 1102 and/or the servers 1104 in any manner. For instance, in one case, the production system 202 is entirely implemented by one or more of the servers 1104. Each user may interact with the servers 1104 via a browser application or other programmatic interface provided by a user computing device. In another case, the production system 202 is entirely implemented by a user computing device in local fashion, in which case no interaction with the servers 1104 is necessary. In another case, the functionality associated with the production system 202 is distributed between the servers 1104 and each user computing device in any manner.

Figure 12:
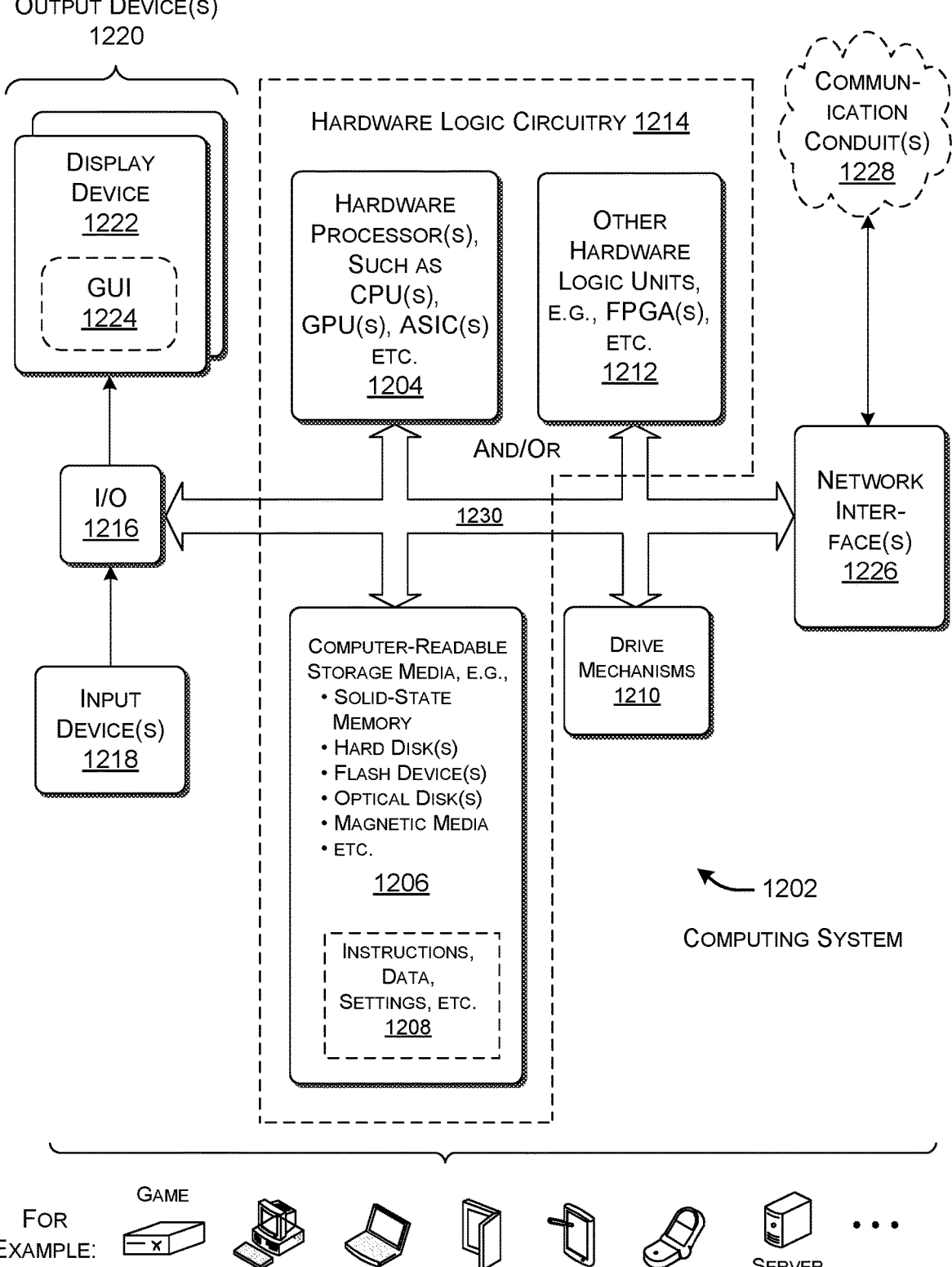
FIG. 12 shows an illustrative type of computing system that can be used to implement any aspect of the features shown in the foregoing drawings.

FIG. 12 shows a computing system 1202 that can be used to implement any aspect of the mechanisms set forth in the above-described figures. For instance, the type of computing system 1202 shown in FIG. 12 can be used to implement any user computing device or any server shown in FIG. 11. In all cases, the computing system 1202 represents a physical and tangible processing mechanism.

The computing system 1202 can include one or more hardware processors 1204. The hardware processor(s) 1204 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1202 can also include computer-readable storage media 1206, corresponding to one or more computer-readable media hardware units. The computer-readable storage media 1206 retains any kind of information 1208, such as machine-readable instructions, settings, data, etc. Without limitation, the computer-readable storage media 1206 may include one or more solid-state devices, one or more magnetic hard disks, one or more optical disks, magnetic tape, and so on. Any instance of the computer-readable storage media 1206 can use any technology for storing and retrieving information. Further, any instance of the computer-readable storage media 1206 may represent a fixed or removable unit of the computing system 1202. Further, any instance of the computer-readable storage media 1206 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1202 can utilize any instance of the computer-readable storage media 1206 in different ways. For example, any instance of the computer-readable storage media 1206 may represent a hardware memory unit (such as Random Access Memory (RAM)) for storing transient information during execution of a program by the computing system 1202, and/or a hardware storage unit (such as a hard disk) for retaining/archiving information on a more permanent basis. In the latter case, the computing system 1202 also includes one or more drive mechanisms 1210 (such as a hard drive mechanism) for storing and retrieving information from an instance of the computer-readable storage media 1206.

The computing system 1202 may perform any of the functions described above when the hardware processor(s) 1204 carry out computer-readable instructions stored in any instance of the computer-readable storage media 1206. For instance, the computing system 1202 may carry out computer-readable instructions to perform each block of the processes described in Section B.

Alternatively, or in addition, the computing system 1202 may rely on one or more other hardware logic units 1212 to perform operations using a task-specific collection of logic gates. For instance, the hardware logic unit(s) 1212 may include a fixed configuration of hardware logic gates, e.g., that are created and set at the time of manufacture, and thereafter unalterable. Alternatively, or in addition, the other hardware logic unit(s) 1212 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 12 generally indicates that hardware logic circuitry 1214 includes any combination of the hardware processor(s) 1204, the computer-readable storage media 1206, and/or the other hardware logic unit(s) 1212. That is, the computing system 1202 can employ any combination of the hardware processor(s) 1204 that execute machine-readable instructions provided in the computer-readable storage media 1206, and/or one or more other hardware logic unit(s) 1212 that perform operations using a fixed and/or programmable collection of hardware logic gates. More generally stated, the hardware logic circuitry 1214 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1214 that performs a particular function or combination of functions.

In some cases (e.g., in the case in which the computing system 1202 represents a user computing device), the computing system 1202 also includes an input/output interface 1216 for receiving various inputs (via input devices 1218), and for providing various outputs (via output devices 1220). Illustrative input devices include a keyboard device, a mouse input device, a touchscreen input device, a digitizing pad, one or more static image cameras, one or more video cameras, one or more depth camera systems, one or more microphones, a voice recognition mechanism, any positiondetermining devices (e.g., GPS devices), any movement detection mechanisms (e.g., accelerometers, gyroscopes, etc.), and so on. One particular output mechanism may include a display device 1222 and an associated graphical user interface presentation (GUI) 1224. The display device 1222 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1202 can also include one or more network interfaces 1226 for exchanging data with other devices via one or more communication conduits 1228. One or more communication buses 1230 communicatively couple the above-described units together.

The communication conduit(s) 1228 can be implemented in any manner, e.g., by a local area computer network, a wide area computer network (e.g., the Internet), point-to-point connections, etc., or any combination thereof. The communication conduit(s) 1228 can include any combination of hardwired links, wireless links, routers, gateway functionality, name servers, etc., governed by any protocol or combination of protocols.

FIG. 12 shows the computing system 1202 as being composed of a discrete collection of separate units. In some cases, the collection of units corresponds to discrete hardware units provided in a computing device chassis having any form factor. FIG. 12 shows illustrative form factors in its bottom portion. In other cases, the computing system 1202 can include a hardware logic unit that integrates the functions of two or more of the units shown in FIG. 1. For instance, the computing system 1202 can include a system on a chip (SoC or SOC), corresponding to an integrated circuit that combines the functions of two or more of the units shown in FIG. 12.

The following summary provides a non-exhaustive set of illustrative examples of the technology set forth herein.

(A1) According to a first aspect, some implementations of the technology described herein include a method (e.g., the process 902) for generating a machine-trained model (e.g., the machine-trained model 204). The process includes: obtaining (e.g., 904) a first batch (e.g., 928) of training examples; selecting (e.g., 906) a first sub-network (e.g., 118), within a set of selectable sub-networks (e.g., 116), to process the first batch in a first pass of a neural network (e.g., 104), the selectable sub-networks having different respective sets of parameters; selecting (e.g., 908) a second sub-network (e.g., 122), within the set of selectable sub-networks, to process the first batch in a second pass of the neural network; generating (e.g., 910) first prediction information in the first pass for the first batch by processing the first batch using the selected first sub-network; generating (e.g., 912) second prediction information in the second pass for the first batch by processing the first batch using the selected second sub-network; and updating (e.g., 914) model parameters of the machine-trained model for the first batch based on: first loss information, second loss information, and divergence information. The first loss information describes a difference between the first prediction information and ground-truth information. The second loss information describes a difference between the second prediction information and the ground-truth information. The divergence information describes a divergence between the first prediction information and the second prediction information. The process repeats (e.g., 916) the operation of obtaining to the operation of updating for one or more additional batches, until a training objective is achieved, to produce the machine-trained model. The process then includes storing (e.g., 918) the machine-trained model in a model data store (e.g., 208).

According to one aspect, the process 902 improves the performance of the machine-trained model 204 by collecting and utilizing the divergence information. That is, this process of regularization ensures that the selectable sub-networks 116 are trained in a generally equal manner. The use of the selectable sub-networks 116 in the training stage also improves generalization performance.

According to another aspect, various aspects of the process 902 result in the production of a compact and resource-efficient machine-trained model 204. One contributing factor is the use of the selectable sub-networks 116 in the training stage, which results in the production of a machine-trained model with a reduced number of parameters compared to some densely-activated neural networks. Another aspect is the removal of the traditional gating mechanism found in traditional sparsely-activated neural networks.

(A2) According some implementations of the method of A1, the first sub-network and the second sub-network are randomly selected.

(A3) According some implementations of the method of A1 or A2, each sub-network in the set of selectable sub-networks is a feed-forward neural network.

(A4) According some implementations of the method of any of A1-A3, the set of selectable sub-networks is part of a transformer block of the neural network.

(A5) According some implementations of the method of A4, the transformer block is part of a standalone encoder system.

(A6) According some implementations of the method of A4, the transformer block is part of a standalone decoder system.

(A7) According some implementations of the method of A4, the transformer block is part of an encoder-decoder system.

(A8) According some implementations of the method of A4, the neural network has plural transformer blocks, at least two of which include respective sets of selectable sub-networks.

(A9) According some implementations of any of the methods of A1-A8, the operation of updating includes updating the model parameters to reduce a combined effect of the first loss information, the second loss information, and the divergence information.

(A10) According some implementations of any of the methods of A1-A9, the divergence information includes first divergence information that describes divergence of the first prediction information from the second prediction information, and second divergence information that describes divergence of the second prediction information from the first prediction information.

(A11) According some implementations of any of the methods of A1-A10, the machine-trained model that is produced includes a chosen sub-network in the set of selectable sub-networks, and excludes at least one other sub-network that is not chosen.

(B1) According to a second aspect, some implementations of the technology described herein include a method (e.g., the process 1002) for applying a machine-trained model (e.g., the machine-trained model 204). The process includes: obtaining (e.g., 1004) input information provided by a user; using (e.g., 1006) the machine-trained model to map the input information to output information; and providing (e.g., 1008) the output information to the user. The machine-trained model is generated using a prior training process, corresponding to the method of A1.

(B2) According some implementations of the method of B1, the input information is a query specified by the input user, and wherein the output information is keyword information generated by the machine-trained model for the query.

(B3) According some implementations of the method of B1, the input information is initial textual information specified by the input user, and wherein the output information is a textual description generated by the machine-trained model by expanding the initial textual information.

(B4) According some implementations of the method of B1, the input information is an instance of text in a first natural language, and wherein the output information is text in a second natural language produced by the machine-trained model by translating the text in the first natural language.

In yet another aspect, some implementations of the technology described herein include a computing system (e.g., computing system 1202) that includes hardware logic circuitry (e.g., 1214) that is configured to perform any of the methods described herein (e.g., methods A1-A11 and B1-B4).

In yet another aspect, some implementations of the technology described herein include a computer-readable storage medium (e.g., 1206) for storing computer-readable instructions (e.g., 1208). The computer-readable instructions, when executed by one or more hardware processors (e.g., 1204), perform any of the methods described herein (e.g., methods A1-A11 and B1-B4).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1214 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to some implementations among potentially many other implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a machine-trained model, the machine-trained model being a multi-layer neural network including a pipeline of different layers, the multi-layer neural network having machine-trained parameters that govern operation of the multi-layer neural network, comprising:

successively processing a plurality of batches of training examples to achieve a training objective, the processing for a first batch of training examples of the plurality of batches including:

obtaining the first batch of training examples;

selecting a first sub-network, within a set of selectable sub-networks that is part of the pipeline of the multi-layer neural network, to process the first batch in a first pass of forward inference, the selectable sub-networks having different respective sets of parameters;

selecting a second sub-network, within the set of selectable sub-networks that is part of the pipeline of the multi-layer neural network, to process the first batch in a second pass of forward inference;

generating first prediction information in the first pass of forward inference for the first batch by processing the training examples of the first batch using the selected first sub-network, the first prediction information being a probability distribution of predictions made over the first batch based on output information produced by the multi-layered neural network in the first pass of forward inference;

generating second prediction information in the second pass of forward inference for the first batch by processing the training examples of the first batch using the selected second sub-network, the second prediction information being a probability distribution of predictions made over the first batch based on output information produced by the multi-layered neural network in the second pass of forward inference;

generating a loss measure, for the first batch, using an objective function that expresses a combined effect of: first loss information, second loss information, and divergence information, the first loss information being a difference between the first prediction information and ground-truth information, the ground-truth information including correct transformations of the training examples in the first batch, the second loss information being a difference between the second prediction information and the ground-truth information, and the divergence information being a divergence between the first prediction information and second prediction information;

updating parameters of the multi-layer neural network that contributed to processing the first batch based on the loss measure by back-propagating gradients through the multi-layer neural network, the parameters that contributed to processing the first batch including parameters of the first sub-network and second sub-network;

repeating said obtaining to said updating for additional batches of the plurality of batches;

after processing of the plurality batches, producing a final machine-trained model for use in a production system that includes a chosen one of the set of selectable sub-networks that has been trained, the final machine-trained model including parameters of the chosen one of the set of selectable sub-networks; and storing the final machine-trained model in a model data store, wherein the pipeline of the multi-layer neural network includes, in order, one or more initial layers prior to the set of selectable sub-networks, the set of selectable sub-networks, and one or more subsequent layers that follow the set of selectable networks.

2. The method of claim 1, wherein the first sub-network and the second sub-network are randomly selected for each batch of the plurality of batches.

3. The method of claim 1, wherein each sub-network in the set of selectable sub-networks is a feed-forward neural network of the multi-layer neural network.

4. The method of claim 1, wherein the set of selectable sub-networks is part of a transformer block of a transformer neural network.

5. The method of claim 4, wherein the transformer block is part of:

a standalone encoder system; or standalone decoder system; or an encoder-decoder system.

6. The method of claim 4, wherein each sub-network in the set of selectable sub-networks is a feed-forward neural network of the transformer block.

7. The method of claim 4, wherein the neural network has plural transformer blocks, at least two of which include respective sets of selectable sub-networks.

8. The method of claim 1, wherein the updating of the parameters reduces the combined effect of the first loss information, the second loss information, and the divergence information.

9. The method of claim 1, wherein the divergence information includes first divergence information that describes divergence of the first prediction information from the second prediction information, and second divergence information that describes divergence of the second prediction information from the first prediction information.

10. The method of claim 1, wherein the final machine-trained model that is produced excludes at least one other sub-network that is not chosen.

11. A computing system for applying a final machine-trained model, the final machine-trained model being a multi-layer neural network including a pipeline of different layers, the multi-layer neural network having machine-trained parameters that govern operation of the multi-layer neural network, comprising:

hardware logic circuitry, the hardware logic circuitry corresponding to: (a) one or more hardware processors that perform operations by executing machine-readable instructions stored in a memory, and/or (b) one or more other hardware logic components that perform the operations using a collection of logic gates, the operations including:

obtaining input information;

in a production system, using the final machine-trained model to map the input information to output information; and serving the output information, the final machine-trained model having been generated using a training process, the training process that was performed including successively processing a plurality of batches of training examples to achieve a training objective, the processing for a first batch of training examples of the plurality of batches including:

obtaining the first batch of training examples;

selecting a first sub-network, within a set of selectable sub-networks that is part of the pipeline of the multi-layer neural network, to process the first batch in a first pass of forward interference, the selectable sub-networks having different respective sets of parameters;

selecting a second sub-network, within the set of selectable sub-networks that is part of the pipeline of the multi-layer neural network, to process the first batch in a second pass of forward inference;

generating first prediction information in the first pass of forward inference for the first batch by processing the training examples of the first batch using the selected first sub-network, the first prediction information being a probability distribution of predictions made over the first batch based on output information produced by the multi-layered neural network in the first pass of forward inference;

generating second prediction information in the second pass of forward inference for the first batch by processing training examples of the first batch using the selected second sub-network, the second prediction information being a probability distribution of predictions made over the first batch based on output information produced by the multi-layered neural network in the second pass of forward inference;

generating a loss measure, for the first batch, using an objective function that expresses a combined effect of: first loss information, second loss information, and divergence information, the first loss information being a difference between the first prediction information and ground-truth information, the ground-truth information including correct transformations of the training examples in the first batch, the second loss information being a difference between the second prediction information and the ground-truth information, and the divergence information being a divergence of the first prediction information from the second prediction information;

updating parameters of the multi-layer neural network that contributed to processing the first batch based on the loss measure by back-propagating gradients through the multi-layer neural network, the parameters that contributed to processing the first batch including parameters of the first sub-network and second sub-network;

repeating said obtaining to said updating for additional batches of the plurality of batches; and after processing of the plurality batches, producing the final machine-trained model, the final machine-trained model including a chosen one of the set of selectable sub-networks that has been trained, the final machine-trained model including parameters of the chosen one of the set of selectable sub-networks; and storing the final machine-trained model in a model data store, wherein the pipeline of the multi-layer neural network includes, in order, one or more initial layers prior to the set of selectable sub-networks, the set of selectable sub-networks, and one or more subsequent layers that follow the set of selectable networks.

12. The computing system of claim 11, wherein the input information is a query, and wherein the output information is keyword information generated by the final machine-trained model for the query.

13. The computing system of claim 11, wherein the input information is initial textual information, and wherein the output information is a textual description generated by the final machine-trained model by expanding the initial textual information.

14. The computing system of claim 11, wherein the input information is an instance of text in a first natural language, and wherein the output information is text in a second natural language produced by the final machine-trained model by translating the text in the first natural language.

15. A non-transitory computer-readable storage medium for storing computer-readable instructions, the computer-readable instructions, when executed by one or more hardware processors, performing a method that comprises:

successively processing a plurality of batches of training examples to train a multi-layer neural network having a pipeline of layers, the multi-layer neural network having machine-trained parameters that govern operation of the multi-layer neural network, the processing for a first batch of the plurality of batches including:

obtaining the first batch of training examples;

selecting a first sub-network, within a set of selectable sub-networks that is part of the pipeline of the multi-layer neural network, to process the first batch in a first pass of forward inference, the selectable sub-networks having different respective sets of parameters, and the set of selectable sub-networks being implemented by a transformer block of the neural network;

selecting a second sub-network, within the set of selectable sub-networks that is part of the pipeline of the multi-layer neural network, to process the first batch in a second pass of forward inference;

generating first prediction information in the first pass of forward interference for the first batch by processing the training examples of the first batch using the selected first sub-network, the first prediction information being a probability distribution of predictions made over the first batch based on output information produced by the multi-layered neural network in the first pass of forward inference;

generating second prediction information in the second pass of forward inference for the first batch by processing training examples of the first batch of training examples using the selected second sub-network, the second prediction information being a probability distribution of predictions made over the first batch based on output information produced by the multi-layered neural network in the second pass of forward inference;

generating a loss measure, for the first batch, using an objective function that expresses a combined effect of: first loss information, second loss information, and divergence information, the first loss information being a difference between the first prediction information and ground-truth information, the ground-truth information including correct transformations of the training examples in the first batch, the second loss information being a difference between the second prediction information and the ground-truth information, and the divergence information being a divergence of the first prediction information from the second prediction information;

updating parameters of the multi-layer neural network that contributed to processing the first batch based on the loss measure by back-propagating gradients through the multi-layer neural network, the parameters that contributed to processing the first batch including parameters of the first sub-network and second sub-network;

repeating said obtaining to said updating for additional batches of the plurality of batches;

after processing of the plurality batches, producing a final machine-trained model for use in a production system that includes a chosen one of the set of selectable sub-networks that has been trained, the final machine-trained model including parameters of the chosen one of the set of selectable sub-networks; and storing the final machine-trained model in a model data store, wherein the pipeline of the multi-layer neural network includes, in order, one or more initial layers prior to the set of selectable sub-networks, the set of selectable sub-networks, and one or more subsequent layers that follow the set of selectable networks.

16. The non-transitory computer-readable storage medium of claim 15, wherein the first sub-network and the second sub-network are randomly selected for each batch of the plurality of batches.

17. The non-transitory computer-readable storage medium of claim 15, wherein each sub-network in the set of sub-networks is a feed-forward neural network of the multi-layer neural network.

18. The method of claim 1, wherein cross entropy is used to generate the first loss information and the second loss information, and where KL divergence is used to generate the divergence information.

19. The method of claim 1, wherein the generating first prediction information includes, based on received instructions, routing information flowing into the set of selectable sub-networks to the first sub-network, and the generating second prediction information includes, based on received instructions, routing information flowing into the set of selectable sub-networks to the second sub-network.

* * * * *